United States Patent
Orfahli

(10) Patent No.: US 9,946,095 B2
(45) Date of Patent: Apr. 17, 2018

(54) EYEGLASSES WITH TOPSIDE REMOVABLE LENSES AND FRAMES

(71) Applicant: David Orfahli, Brooklyn, NY (US)

(72) Inventor: David Orfahli, Brooklyn, NY (US)

(*) Notice: Subject to any disclaimer, the term of this patent is extended or adjusted under 35 U.S.C. 154(b) by 0 days.

(21) Appl. No.: 15/615,893

(22) Filed: Jun. 7, 2017

(65) Prior Publication Data
US 2017/0269383 A1    Sep. 21, 2017

(51) Int. Cl.
  *G02C 5/00*    (2006.01)
  *G02C 9/04*    (2006.01)
  *G02C 7/02*    (2006.01)

(52) U.S. Cl.
  CPC ................. *G02C 9/04* (2013.01); *G02C 7/02* (2013.01); *G02C 2200/02* (2013.01); *G02C 2200/08* (2013.01)

(58) Field of Classification Search
  CPC .......... G02C 13/001; G02C 2200/02–2200/22; G02C 1/06; G02C 5/02; G02C 5/008; G02C 5/22; G02C 5/126; G02C 5/2281; G02C 5/229; G02C 9/04; G02C 11/02; G02C 3/003; G02C 11/00; G02C 5/005; G02C 5/12; G02C 5/2209; G02C 1/04; G02C 1/081; G02C 1/10
  USPC ......... 351/41, 47, 52, 83–86, 110, 103, 106, 351/140, 178, 231, 51, 57–59, 90–97, 351/111, 116, 141, 154, 156, 158
  See application file for complete search history.

(56) References Cited

U.S. PATENT DOCUMENTS

| | | |
|---|---|---|
| 3,838,914 A | 10/1974 | Fernandez |
| 4,196,981 A | 4/1980 | Waldrop |
| 4,685,782 A | 8/1987 | Lhospice |
| 5,181,051 A | 1/1993 | Townsend et al. |
| 5,373,331 A * | 12/1994 | Vallalla ............... G02C 1/08 351/156 |
| 5,467,148 A | 11/1995 | Conway |
| 6,585,370 B2 | 7/2003 | Zelman |
| 7,014,313 B1 | 3/2006 | Lee et al. |
| 7,048,372 B1 | 5/2006 | Cohen |
| 7,140,727 B2 | 11/2006 | Pilat et al. |
| 8,292,427 B2 | 10/2012 | Zelazowski |
| 8,480,226 B2 | 7/2013 | Ifergan |
| 9,081,213 B2 | 7/2015 | Weinberg |
| 2008/0013039 A1 | 1/2008 | Lerner et al. |
| 2011/0007263 A1* | 1/2011 | DiChiara ............ G02C 1/04 351/154 |
| 2015/0168745 A1* | 6/2015 | Weinberg ............ G02C 5/02 351/52 |

* cited by examiner

*Primary Examiner* — Mustak Choudhury
(74) *Attorney, Agent, or Firm* — Michael J. Feigin, Esq.; Feigin and Fridman

(57) ABSTRACT

Eyeglasses with a removable upper section are disclosed. The upper section is pre-attached to the lenses, such that the upper section of the eyeglasses is lowered, each with a respective lens, into a lower section of the eyeglasses. The upper section and lower section then form a continuous front face of the eyeglasses and are held together by connectors, such as magnets at extreme left and right sides of the upper sections to magnets within a cutout of the lower section adapted to fit the upper section there-within. This creates, at least a continuous top side and front side of the eyeglasses with lenses between the upper and lower portions thereof.

19 Claims, 4 Drawing Sheets

EYEGLASSES WITH TOPSIDE REMOVABLE LENSES AND FRAMES

FIELD OF THE DISCLOSED TECHNOLOGY

The disclosed technology relates generally to eyeglasses, and more specifically, to those with interchangeable lenses.

BACKGROUND

It is quite common for eyeglasses to fall from the wearer and break. This can also happen during sports activities and the like when force is applied against the glasses which causes the lens to break or become scratched. Typically, when this happens, one has to replace the eye wear entirely which is costly.

Further, many people have multiple eyeglasses. One might be used for reading while the other is used for driving or viewing distances. One might be used as sunglasses to decrease light intensity to the eyes, while another is used for indoor and less bright scenarios.

What is needed is a way to be able to change out or replace a lens with another, when one becomes scratched, broken, or undesirable for the present circumstances. At present, very small screws are often used along with guide wires and precise placement of very small pieces which make changing lenses very difficult. A skilled professional is often required, and though the frames often remain perfectly fine, they have to be thrown out with the lenses because new lenses are no longer made to the specification of the old frames, or would require the wearer go without frames for a period of time. The latter is problematic, because most people who wear glasses need them to function each day.

SUMMARY OF THE DISCLOSED TECHNOLOGY

Eyeglasses with removable lenses of embodiments of the disclosed technology have a one-piece or unitary lower section. A "one-piece" or "unitary" device is defined as one which is either or both a) created at one time from a single mold, and/or b) has a smooth, continuous, uninterrupted front surface. Within this unitary lower section, a left cavity and a right cavity each having an upward-oriented opening are created. Between these cavities is a bridge connecting the left and right sides, adapted for placement over a nose, and which has there-below a center cavity opened downward. A left and right lens are each held by a respective left and right upper section, the left upper section closing the opening of the left cavity and the right upper section closing the opening of the right cavity.

For purposes of this disclosure, cardinal directions are relative to the orientation of one who is wearing the eyeglasses in a normal fashion. Thus, a "left lens" would be in front of a left eye. An "upper section" is the section which is furthest from the earth when worn by a person standing on the ground, and so forth. An "inside", as used in this disclosure, refers to a medial direction (toward the middle or center cavity), wherein an "outside" would be the lateral sides (where the arms that extend over the temples of a wearer are).

To an outside of each of the left cavity and right cavity, the lower section further has, in some embodiments, at a left side and a right side, a substantially vertical portion substantially at a right angle to an adjoining substantially horizontal portion. This is a sort of "cutout" from the continuous curvilinear structure of the lower section. The curvilinear portions have an abrupt (greater than 30, 45, 60, or 85 degree) end with a sharp cut at the horizontal and/or vertical portions described. The right and left upper sections fill in the cutout region where the curvilinear portions would seem to fill if they continued without the abrupt end at the vertical and/or horizontal portions. These vertical and horizontal portions are at, or substantially at, right angles to one another and adjoining (continuous from one to the other) in embodiments of the disclosed technology.

Each substantially vertical portion or each substantially horizontal portion has a connector (a device used to connect two different parts together temporarily or permanently) adapted to connect with a portion of one of the left upper section or the right upper section. Such a connector can be a magnet, which uses magnetic forces to hold one of the left upper portion or section or right upper portion or section in place. This can be by way of magnetic attraction to a magnet in one of the upper portions, such as to or at an extreme left/right side of a respective upper portion. Further, a magnet within the bridge of the lower portion of the frame can further hold one of the upper sections to the lower sections, and/or enclose a lens within one of the cavities and one of the upper portions.

The connector can also be a vertically extending male flange on a bottom side of the left upper section or the right upper section which engages with a portal extending through the adjoining horizontal portion. Or, one can use a screw which passes through a portal which extends through from a top side to a bottom side of one of the left upper section or said right upper section. In such an embodiment, a portal extends through the adjoining horizontal portion, and a second portal extends through another horizontal portion of the bridge of the eyeglasses.

Described another way, embodiments of the disclosed technology include eyeglasses with removable lenses where two upper portions are mirror images of one another, and a single, unitary lower portion has a bridge section in the middle (having a line of symmetry there-between in the vertical direction). Two mirrored curvilinear sides are cut into at top and medial/inner edges thereof. The term "cut into" is defined as having an angle of greater than 45 degrees". One side of the material which has been "cut into" has a vertical medial side and a curvilinear side outer or lateral side. The other side of the cut is a flat top side of the frame with substantially or fully a 0 or infinite slope at a top edges thereof. A vertical portion and horizontal portion that meet at right angles (or substantially as such) with portions which are cut into being filled by one of the two upper portions or pieces.

The vertical portion is a magnetic connector magnetically holding an extreme left or right side of one of the two upper portions to the lower portion, in some embodiments. The term "extreme" is used to mean "all the way at the end of" in embodiments of the disclosed technology. Within the horizontal portion is a magnetic connector magnetically holding a lower side of one of the two upper portions to the lower portion, in some embodiments. The bridge can also have two magnets. Such magnets are each magnetically connected to one of the two upper portions at an extreme left or right side thereof one of the upper portions.

The horizontal portion can have a portal. When it does, at least one of the two upper portions can then have a corresponding portal (one which lines up with the portal it corresponds with) and a screw extends through each of the corresponding portals to hold the upper region to the lower and the lenses in place. At least one of the two upper portions can have a downwardly extending flange which is permanently connected (designed not to be removed, or for which removal would require physical damage or disconnecting of a unitary part) which extends through the portal of said horizontal portion of the lower section. A second downwardly extending flange in parallel with the downwardly extending flange can be engaged with a portal within the bridge section. A portal within the bridge section, in some embodiments, opens at a horizontally disposed section of the bridge which is at a top of a curvilinear section of the lower portion. A curvilinear top side of the eyeglasses is formed across the two upper portions, the bridge region, and a top side of the lower portion in some embodiments.

Any device or step to a method described in this disclosure can comprise or consist of that which it is a part of, or the parts which make up the device or step. The term "and/or" is inclusive of the items which it joins linguistically and each item by itself. "Substantially" and "generally" is defined as "at least 95% of the term being described" and any device or aspect of a device or method described herein can be read as "comprising" or "consisting" thereof.

DETAILED DESCRIPTION OF EMBODIMENTS OF THE DISCLOSED TECHNOLOGY

Eyeglasses with a removable upper section are disclosed. The upper section is pre-attached to the lenses, such that the upper section of the eyeglasses is lowered, each with a respective lens, into a lower section of the eyeglasses. The upper section and lower section then form a continuous front face of the eyeglasses and are held together by connectors, such as magnets at extreme left and right sides of the upper sections to magnets within a cutout of the lower section adapted to fit the upper section there-within. This creates, at least a continuous top side and front side of the eyeglasses with lenses between the upper and lower portions thereof.

Embodiments of the disclosed technology will become clearer in view of the following description of the figures.

Figure 1:
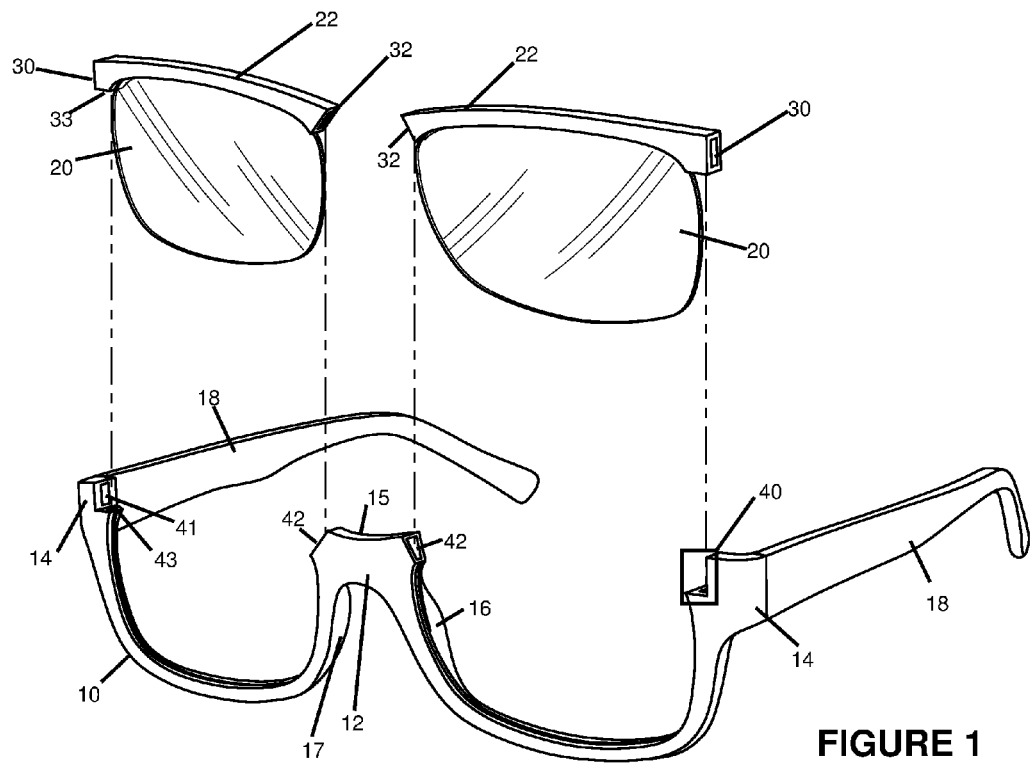
FIG. 1 shows a perspective view from a front of eyeglasses with a combination of lenses and upper regions/sections of frames removed from a lower region of the frame, in an embodiment of the disclosed technology.

FIG. 1 shows a perspective view from the front of eyeglasses with a combination of lenses and upper regions of frames removed from a lower region of the frame, in an embodiment of the disclosed technology. Here, the lower section 10 of the frame is formed of unitary and/or one-piece construction. A front side of the lower section 10 is generally or is flat in embodiments of the disclosed technology. A bridge section 12 is formed between two cavities, the two cavities opening upwards where lenses 20 are placed there-in. The bridge has an inner side 17 which is adapted to rest against a nose of a wearer and an outer side 16 which faces towards, or is adjacent to a lens 20. The bridge section further has a top side 15. At an extreme left and right side of the lower section 10 of the frame are regions 14 which curve from a flat front side, in some embodiments, to join with arms 18 worn over the ear.

A cutout region 40 is cut from the otherwise curvilinear and continuous lower section 10 of the eyeglasses. This cut is abrupt (see definition in the "summary") and the otherwise curvilinear nature of the lower section 10 ends at a horizontal and a vertical section of the lower piece, the "missing" material from what would expect if the section 14 of the lower section 10 continued without an abrupt change in angle or cut out, being filled in by the top section 22 of the eyeglasses (see FIG. 2). Magnets 42 on either side of the bridge (left and right sides) engage or are engageable with respective right and left sides of the upper region 22 of the frames. That is, magnets 30, 32, and 33 can be at extreme left and right sides, or at an extreme bottom edge, of the removable upper portions or regions 22 which engage with magnets in the outer sections 14 of the lower portion 10 as well as on the bridge 12. These magnets hold the upper sections 22 to the lower section 10, with the lenses 20 there-between. The lenses 20 are fixedly attached to the respective upper portions 22, or are attached there-to before the lenses are placed within the cavities of the lower section 10, in some embodiments. Alternatively, the lenses 20 can be placed in the lower section 10 before the upper section(s) 22 are held to the lower section 10. A groove within the upper section 22 or lower section 10 can help frictionally hold the lens 20 in place between an upper section 22 and cavity of a lower section 22, such a cavity being open only along a portion which is traversed by an upper section 22. In this manner, when the upper section 22 is connected via it's magnets 30/32/33 to magnets 40/42/48 of the lower section 10 (also shown in FIG. 5), the lens 20 is surrounded by the lower and upper sections.

Figure 5:
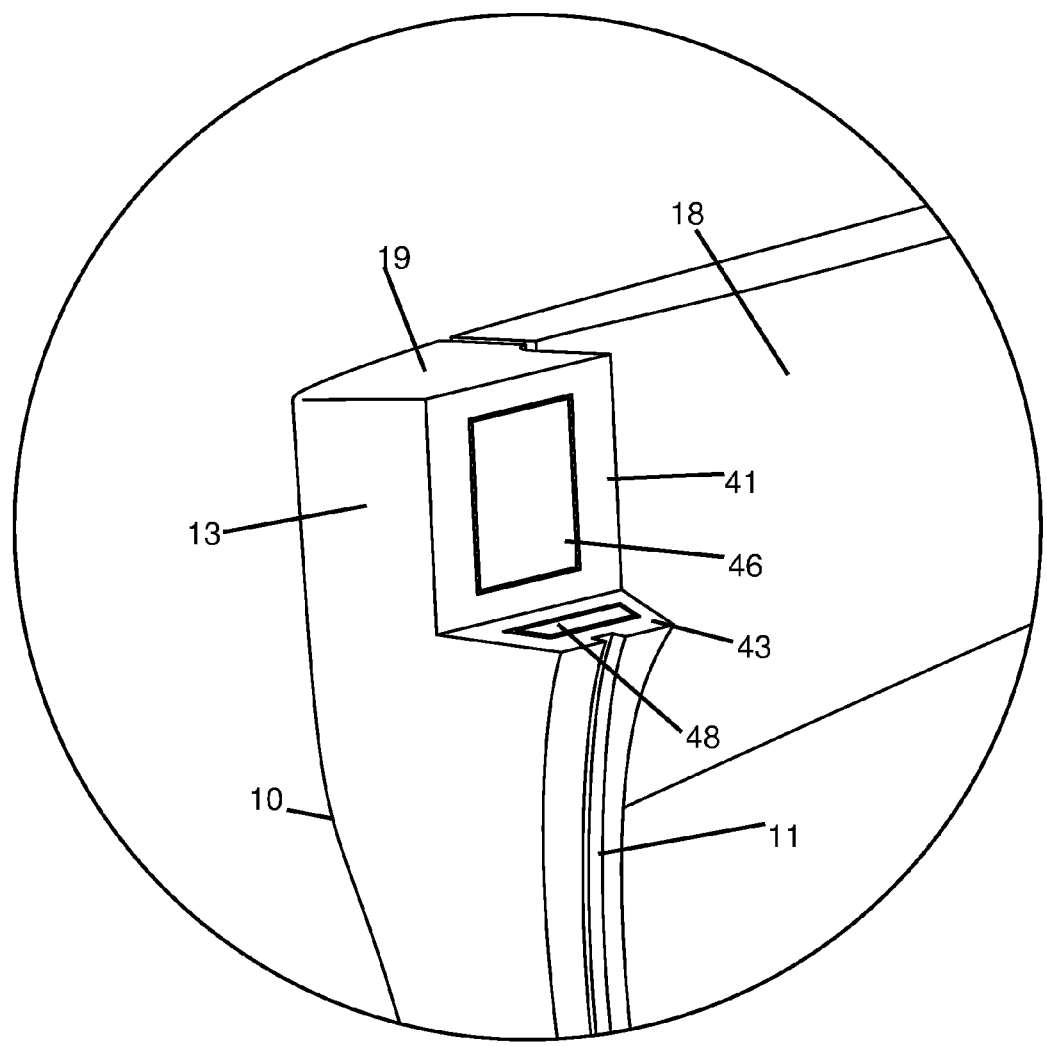
FIG. 5 shows a closeup of an uppermost section of the lower portion of the frame of FIG. 1.

Skipping to FIG. 5, FIG. 5 shows a closeup of an upper most section of the lower portion of the frame of FIG. 1. Here, one can more clearly see a concave lip 11 for receiving an edge of a lens 20 there-within. A horizontal 43 portion of the cutout 40 has a magnet 48, in this embodiment or other connector. The vertical 41 portion of the cutout 40 has a magnet 46 within, or at the surface. The magnets can be beneath or at the surface, as long as they can exert magnetic force against a portion of an upper region 22 to magnetically hold the upper region there-to. The magnets can be other types of connectors in one or both of the horizontal 43 and vertical 41 portions of the connectors. The cutout 40 can further be described as a region which is missing from the lower section 10 of the eyeglasses which would be filled in if the horizontal section 43 continued upward to the top 19 of the vertical section 41 and if the vertical section 41 extended to cover the horizontal section 43 such that the entirety of the front side 13 were increased in length. It is this cutout which is then filled in by the upper section 22 of the eyeglass frame in embodiments of the disclosed technology.

Figure 2:
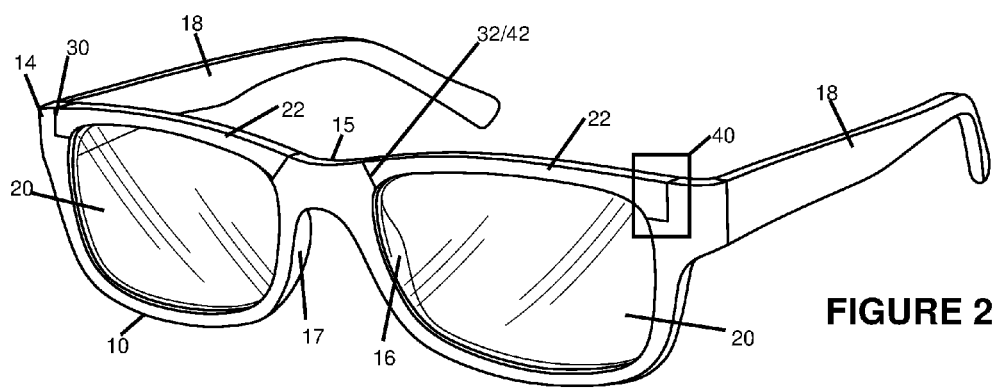
FIG. 2 shows the perspective view of FIG. 1 with the combinations of lenses and upper regions of the frames inserted into the lower region of the frame, in an embodiment of the disclosed technology.

FIG. 2 shows the perspective view of FIG. 1 with the combinations of lenses and upper regions of the frames inserted into the lower region of the frame, in an embodiment of the disclosed technology. Note that when the top sections 22 are connected to the bottom section 10, there is a continuous front face of the eyeglasses, excepting for a small (less than 2 mm) space where the different elements are abutted against one another. As such, the eye wear is complete with lenses 20 held within the frames and surrounded by the lower 10 and upper 22 regions of the frames, the upper regions being held by magnets 32/42 on the inside, and magnets 30/41 on the outside. Note also that the top sections 22 can be removed and replaced with other designs. Patterns, coloration, and even shape of the top sections can vary while using the same lenses and/or lower region 10 of the frame.

Figure 3:
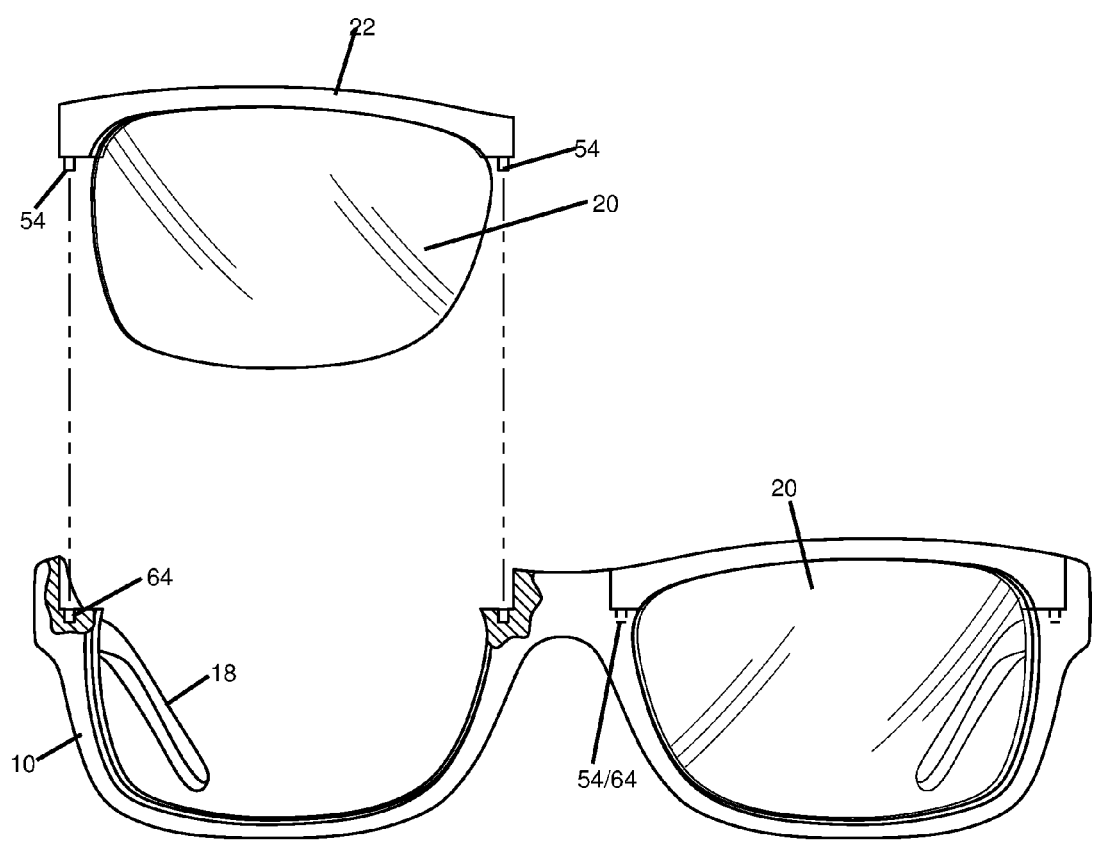
FIG. 3 shows an elevation view of a front of eyeglasses with downwardly extending flanges on either side of an upper region of a frame, in an embodiment of the disclosed technology.

FIG. 3 shows an elevation view of a front of eyeglasses with downwardly extending flanges on either side of an upper region of a frame, in an embodiment of the disclosed technology. Here, downwardly extending flanges 54 extend from a bottom side of a top section 22 of the eyeglasses. These flanges engage with portals 64 within the horizontal sections of the lower portion 10 of the eyeglasses. By way of the flanges 54, the top section 22 can be held into the bottom section 10 by way of frictional engagement and/or gravity.

Figure 4:
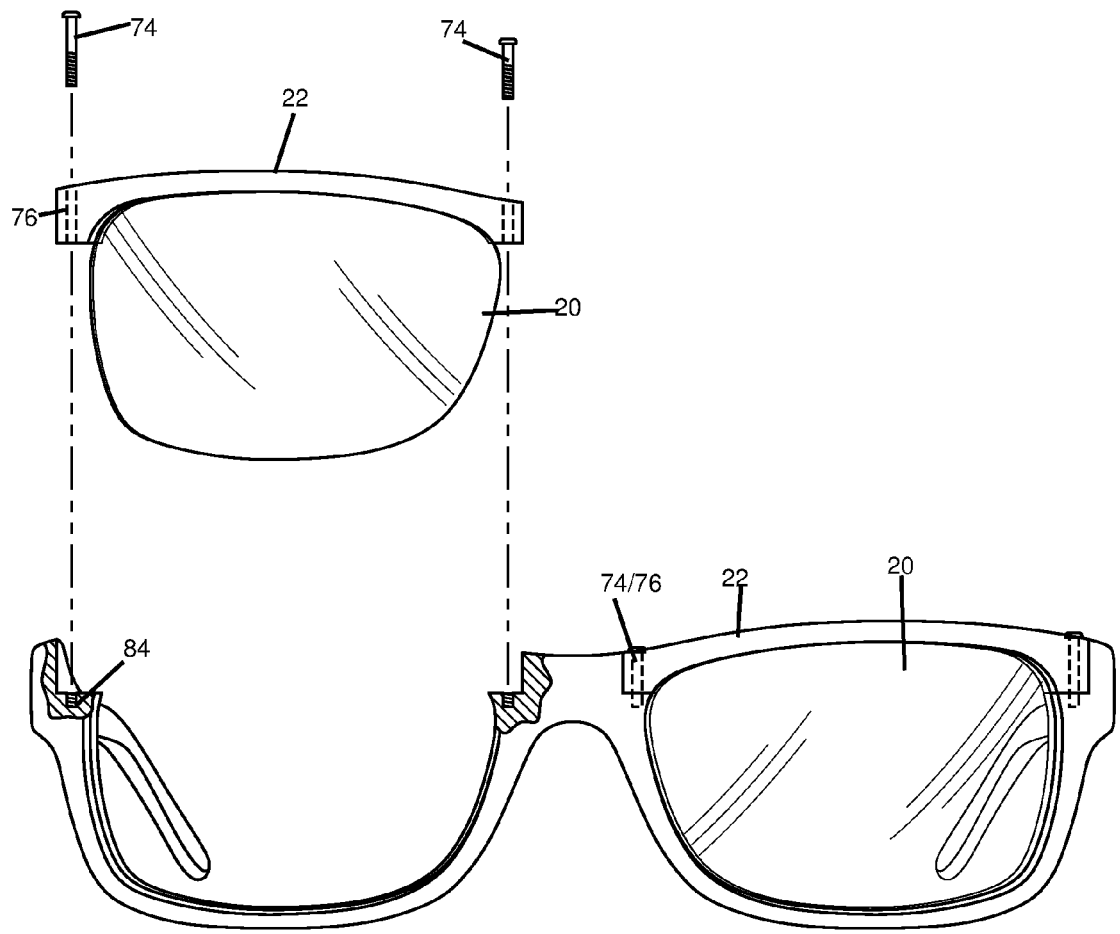
FIG. 4 shows an elevation view of a front of eyeglasses with screws which extend through portals of either side of an upper region of a frame, in an embodiment of the disclosed technology.

FIG. 4 shows an elevation view of a front of eyeglasses with screws which extend through portals on either side of an upper region of a frame, in an embodiment of the disclosed technology. Here, the screws 74 extend through portals 76 of the upper portion 22 and then into portals 84 of the horizontal portions of the lower section 10 of the eyeglasses. This can be instead of, or in addition to the use of magnets as connectors.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods, systems, and devices described hereinabove are also contemplated and within the scope of the disclosed technology.

The invention claimed is:

1. Eyeglasses with removable lenses comprising:
   a unitary lower section forming a left cavity having an upward oriented opening, a right cavity having an upward oriented opening, and a bridge with a center cavity opened downward;
   a left and right lens each fixedly attached to a respective left and right upper section, said left and right upper sections are adapted to fully disengage from said unitary lower section, and to engage said unitary lower section such that said left upper section closes said opening of said left cavity about said left lens and said right upper section closes said opening of said right cavity about said right lens,
   wherein said unitary lower section includes a left extremity to the left of said left cavity and a right extremity to the right of said right cavity, and wherein each of said left and right extremities each include a cutout portion, said cutout portions each including a substantially vertical wall portion and an adjoining substantially horizontal wall portion,
   wherein, in each said cutout portion, said vertical wall portion and said horizontal wall portion are at right angles to each other, and
   wherein, in each said cutout portion, said vertical wall portion is distal to a corresponding one of said left and right cavities.

2. The eyeglasses of claim 1, wherein said left upper section abuts both said left side substantially vertical wall portion and said left side substantially horizontal wall portion; and said right upper section abuts both said right side substantially vertical wall portion and said right side substantially horizontal wall portion.

3. The eyeglasses of claim 2, wherein, in each of said right and left extremities, one of said substantially vertical wall portion and said substantially horizontal wall portion comprises a connector adapted to connect with a portion of a respective one of said left upper section or said right upper section.

4. The eyeglasses of claim 3, wherein said connector is a magnet which magnetically holds one of said left upper section or right upper section by way of a corresponding magnet in one of said upper sections disposed on an extreme left or right side thereof.

5. The eyeglasses of claim 4, further comprising a magnet at an extreme end of each left side and right side of each said left upper section and said right upper section.

6. The eyeglasses of claim 5, wherein one said magnet of each said left upper section and said right upper section is magnetically attached to a magnet within said bridge.

7. The eyeglasses of claim 3, wherein said connector is a vertically extending male flange on a bottom side of said left upper section or said right upper section which engages with a portal extending through said adjoining horizontal wall portion of a corresponding said cutout portion.

8. The eyeglasses of claim 3, wherein said connector is a screw which passes through a portal which extends through from a top side to a bottom side of one of said left upper section or said right upper section.

9. The eyeglasses of claim 8, wherein a portal extends through said horizontal wall portion, and a second portal extends through another horizontal portion of said bridge of said eyeglasses.

10. Eyeglasses with removable lenses comprising:
    two upper portions which are mirror images of one another,
    a single unitary lower portion including:
      a bridge section in the middle; and
      two mirrored curvilinear sides extending outwardly from opposing sides of said bridge section, said curvilinear sides each defining a cavity for receiving a lens, and being cut into at top edges thereof distal to said bridge portion to form a cutout portion, wherein each said cutout portion includes a vertical portion and a horizontal portion that meet at right angles with portions which are cut into and filled by one of said two upper portions, and
      wherein a connector is disposed within said vertical portion, said connector holding an extreme left or right side of one of said two upper portions to said lower portion.

11. The eyeglasses of claim 10, wherein said connector comprises a magnetic connector magnetically holding said extreme left or right side of one of said two upper portions to said lower portion.

12. The eyeglasses of claim 10, wherein a magnetic connector is disposed within said horizontal portion, said magnetic connector magnetically holding a lower side of one of said two upper portions to said lower portion.

13. The eyeglasses of claim 10, wherein two magnets are disposed within said bridge, said two magnets each magnetically connected to one of said two upper portions at an extreme left or right side thereof.

14. The eyeglasses of claim 10, wherein said horizontal portion comprises a portal.

15. The eyeglasses of claim 14, wherein at least one of said two upper portions comprises a portal, adapted to be aligned with said portal of said horizontal portion, such that a screw extends through said portal of said one of said two upper portions and said portal of said horizontal portion.

16. The eyeglasses of claim 14, wherein at least one of said two upper portions comprises a downwardly extending flange which extends through said portal of said horizontal portion.

17. The eyeglasses of claim 16, wherein said at least one of said two upper portions comprises a second downwardly extending flange in parallel with said downwardly extending flange, said second downwardly extending flange being engaged with a portal within said bridge section.

18. The eyeglasses of claim 17, wherein said portal within said bridge section opens at a horizontally disposed section of said bridge which is at a top of a curvilinear section of said lower portion.

19. The eyeglasses of claim 10, wherein a curvilinear top side of said eyeglasses is formed across said two upper portions, said bridge region, and a top side of said lower portion.

\* \* \* \* \*